US012602742B2

(12) United States Patent
Miyagi

(10) Patent No.: US 12,602,742 B2
(45) Date of Patent: Apr. 14, 2026

(54) IMAGE PROCESSING APPARATUS, BINARIZATION METHOD, AND NON-TRANSITORY RECORDING MEDIUM

(71) Applicant: Noriko Miyagi, Kanagawa (JP)

(72) Inventor: Noriko Miyagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 120 days.

(21) Appl. No.: 18/413,383

(22) Filed: Jan. 16, 2024

(65) Prior Publication Data

US 2024/0273674 A1     Aug. 15, 2024

(30) Foreign Application Priority Data

Feb. 14, 2023    (JP) ................................. 2023-020529

(51) Int. Cl.
*G06T 5/40*        (2006.01)
*G06T 7/00*        (2017.01)

(52) U.S. Cl.
CPC .............. *G06T 5/40* (2013.01); *G06T 7/0002* (2013.01)

(58) Field of Classification Search
CPC ................................ G06T 5/40; G06T 7/0002
USPC ......................................................... 345/617
See application file for complete search history.

(56) References Cited

U.S. PATENT DOCUMENTS

| | | | | |
|---|---|---|---|---|
| 5,515,180 A | * | 5/1996 | Maeda .................. | H04N 1/4092 |
| | | | | 358/448 |
| 10,621,459 B2 | * | 4/2020 | Sahara ................. | G06V 30/224 |
| 11,825,190 B2 | * | 11/2023 | Motosugi ............... | G07D 7/206 |
| 2004/0165081 A1 | | 8/2004 | Shibaki et al. | |
| 2009/0147313 A1 | | 6/2009 | Miyagi et al. | |
| 2010/0027038 A1 | | 2/2010 | Miyagi | |
| 2010/0157112 A1 | | 6/2010 | Miyagi | |
| 2011/0222870 A1 | | 9/2011 | Miyagi | |
| 2011/0292417 A1 | | 12/2011 | Miyagi | |
| 2015/0336381 A1 | * | 11/2015 | Kyoso .................... | B41J 2/0451 |
| | | | | 347/14 |
| 2016/0191744 A1 | | 6/2016 | Miyagi | |
| 2016/0205285 A1 | * | 7/2016 | Wakui .................. | H04N 1/3935 |
| | | | | 358/1.2 |
| 2016/0275662 A1 | * | 9/2016 | Hasegawa .......... | H04N 1/00244 |
| 2016/0277644 A1 | * | 9/2016 | Fukase ................ | H04N 1/6041 |
| 2016/0295076 A1 | * | 10/2016 | Sawada ................ | H04N 1/4074 |
| 2017/0019561 A1 | * | 1/2017 | Furuta .................. | G03G 15/043 |
| 2017/0142285 A1 | | 5/2017 | Miyagi | |
| 2018/0054546 A1 | * | 2/2018 | Mori .......................... | G06T 5/40 |
| 2018/0108122 A1 | * | 4/2018 | Fukase ..................... | G06T 7/12 |

(Continued)

FOREIGN PATENT DOCUMENTS

| | | |
|---|---|---|
| JP | 2001-222683 A | 8/2001 |
| JP | 2005-072858 A | 3/2005 |
| JP | 2022-055857 A | 4/2022 |

*Primary Examiner* — David T Welch

(74) *Attorney, Agent, or Firm* — IPUSA, PLLC

(57)           ABSTRACT

An image processing apparatus includes circuitry that calculates, based on pixel values of an input image having M gradations, an N−1 first threshold value, wherein M>N>2, compares the pixel values of the input image with the N−1 first threshold value to generate an N-valued image from the input image, and generates, based on pixel values of each of local regions of the input image and gradation values of each of local regions of the N-valued image, a binarized image obtained by binarizing the input image.

13 Claims, 13 Drawing Sheets

(56) References Cited

U.S. PATENT DOCUMENTS

| 2019/0009523 | A1* | 1/2019 | Morikawa | .............. | B41J 2/2132 |
| 2023/0070333 | A1* | 3/2023 | Tsubaki | ................ | G06T 7/0004 |

* cited by examiner

Figure 1:
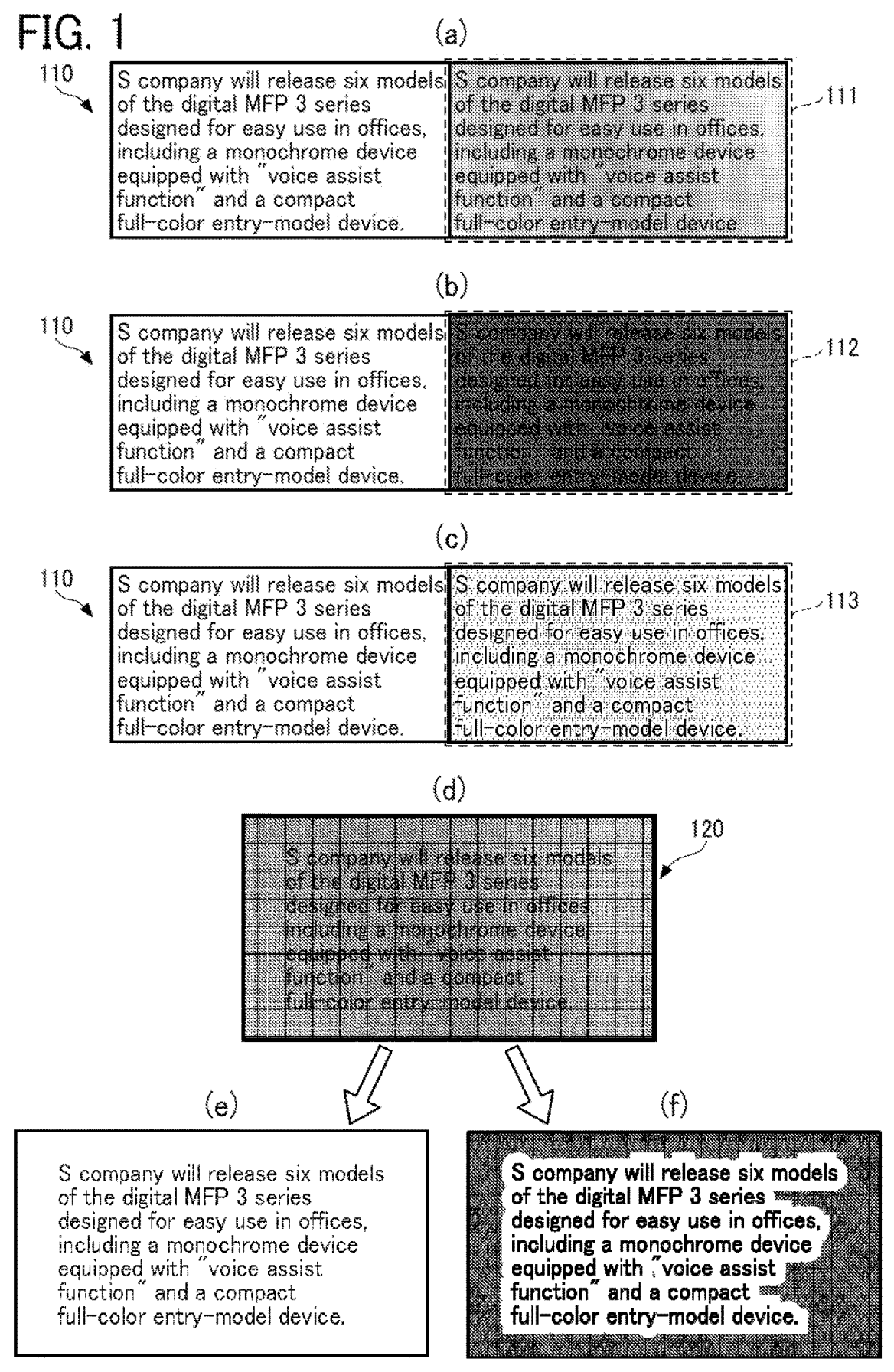

S company will release six models of the digital MFP 3 series designed for easy use in offices, including a monochrome device equipped with "voice assist function" and a compact full-color entry-model device.

S company will release six models of the digital MFP 3 series designed for easy use in offices, including a monochrome device equipped with "voice assist function" and a compact full-color entry-model device.

111

(b)

110

S company will release six models of the digital MFP 3 series designed for easy use in offices, including a monochrome device equipped with "voice assist function" and a compact full-color entry-model device.

S company will release six models of the digital MFP 3 series designed for easy use in offices, including a monochrome device equipped with "voice assist function" and a compact full-color entry-model device.

112

(c)

110

S company will release six models of the digital MFP 3 series designed for easy use in offices, including a monochrome device equipped with "voice assist function" and a compact full-color entry-model device.

S company will release six models of the digital MFP 3 series designed for easy use in offices, including a monochrome device equipped with "voice assist function" and a compact full-color entry-model device.

113

(d)

120

S company will release six models of the digital MFP 3 series designed for easy use in offices, including a monochrome device equipped with "voice assist function" and a compact full-color entry-model device.

(e)

S company will release six models of the digital MFP 3 series designed for easy use in offices, including a monochrome device equipped with "voice assist function" and a compact full-color entry-model device.

(f)

S company will release six models of the digital MFP 3 series designed for easy use in offices, including a monochrome device equipped with "voice assist function" and a compact full-color entry-model device.

FIG. 4

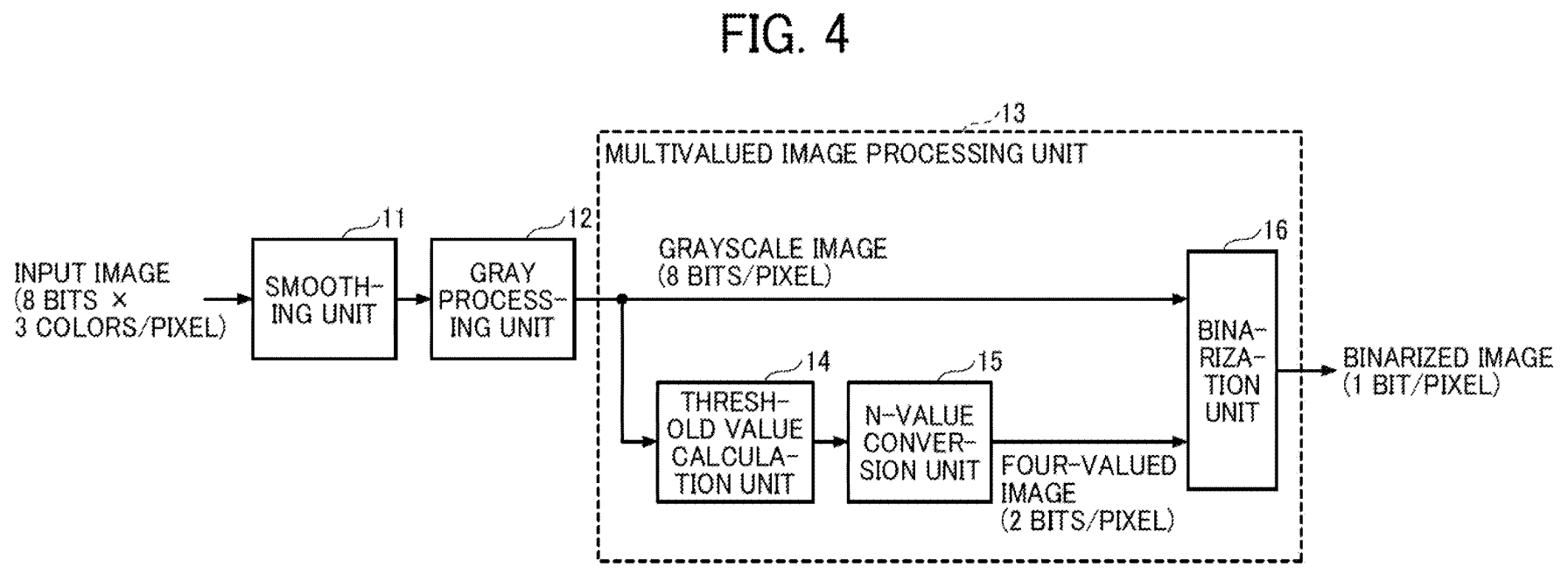

INPUT IMAGE
(8 BITS ×
3 COLORS/PIXEL)

11

SMOOTH-
ING UNIT

12

GRAY
PROCESS-
ING UNIT

13

MULTIVALUED IMAGE PROCESSING UNIT

GRAYSCALE IMAGE
(8 BITS/PIXEL)

14

THRESH-
OLD VALUE
CALCULA-
TION UNIT

15

N-VALUE
CONVER-
SION UNIT

FOUR-VALUED
IMAGE
(2 BITS/PIXEL)

16

BINA-
RIZA-
TION
UNIT

BINARIZED IMAGE
(1 BIT/PIXEL)

FIG. 8

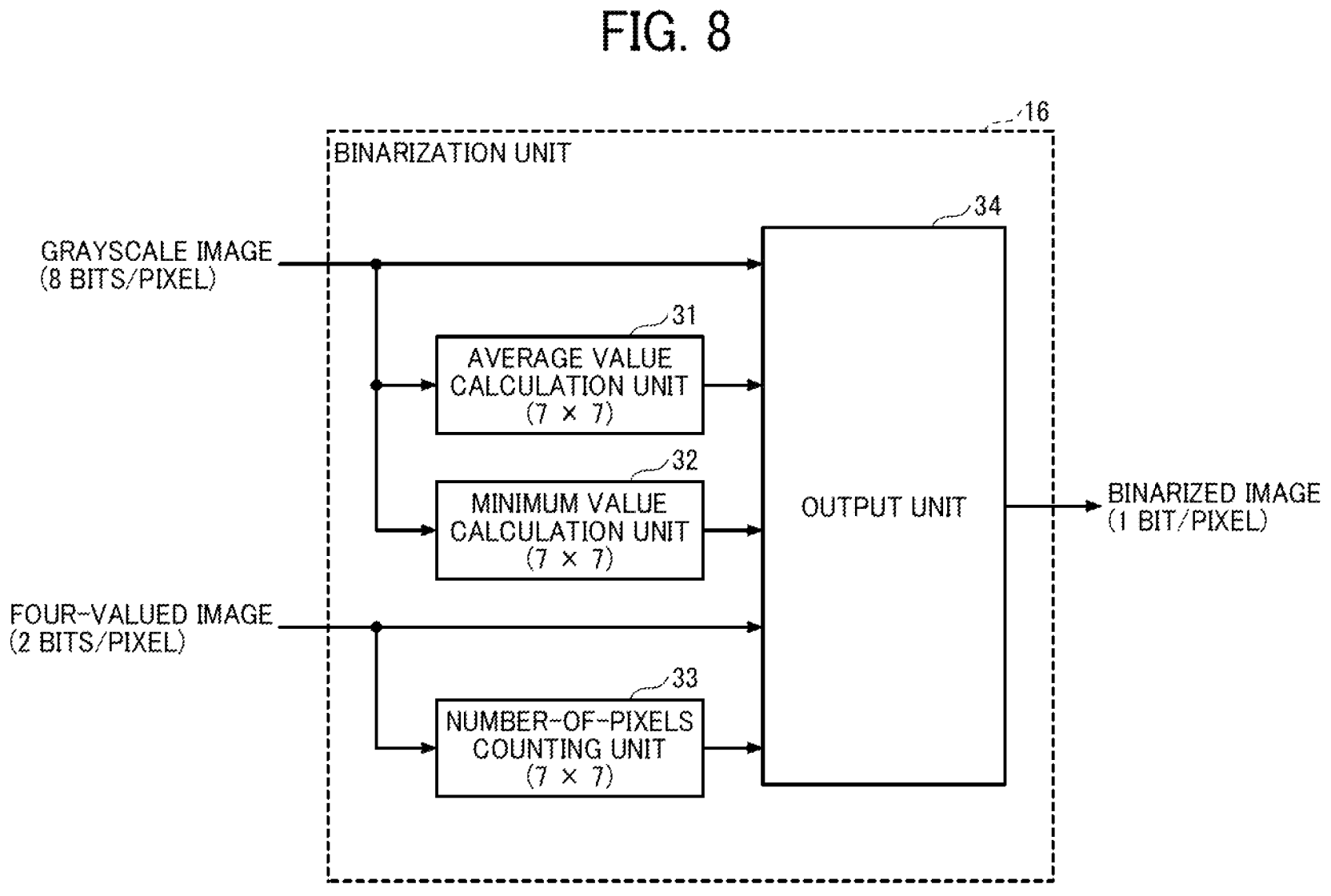

BINARIZED IMAGE
(1 BIT/PIXEL)

16

BINARIZATION UNIT

OUTPUT UNIT

34

31

AVERAGE VALUE
CALCULATION UNIT
(7 × 7)

32

MINIMUM VALUE
CALCULATION UNIT
(7 × 7)

33

NUMBER-OF-PIXELS
COUNTING UNIT
(7 × 7)

GRAYSCALE IMAGE
(8 BITS/PIXEL)

FOUR-VALUED IMAGE
(2 BITS/PIXEL)

FIG. 9
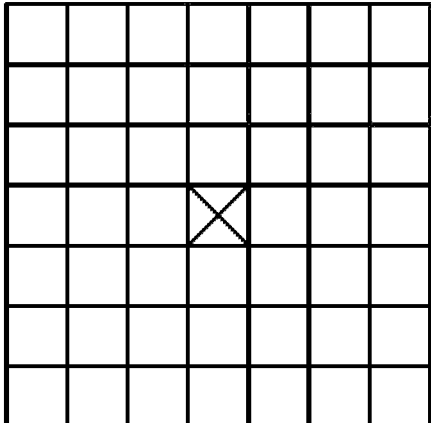
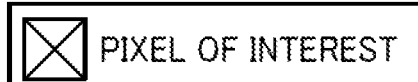 PIXEL OF INTEREST

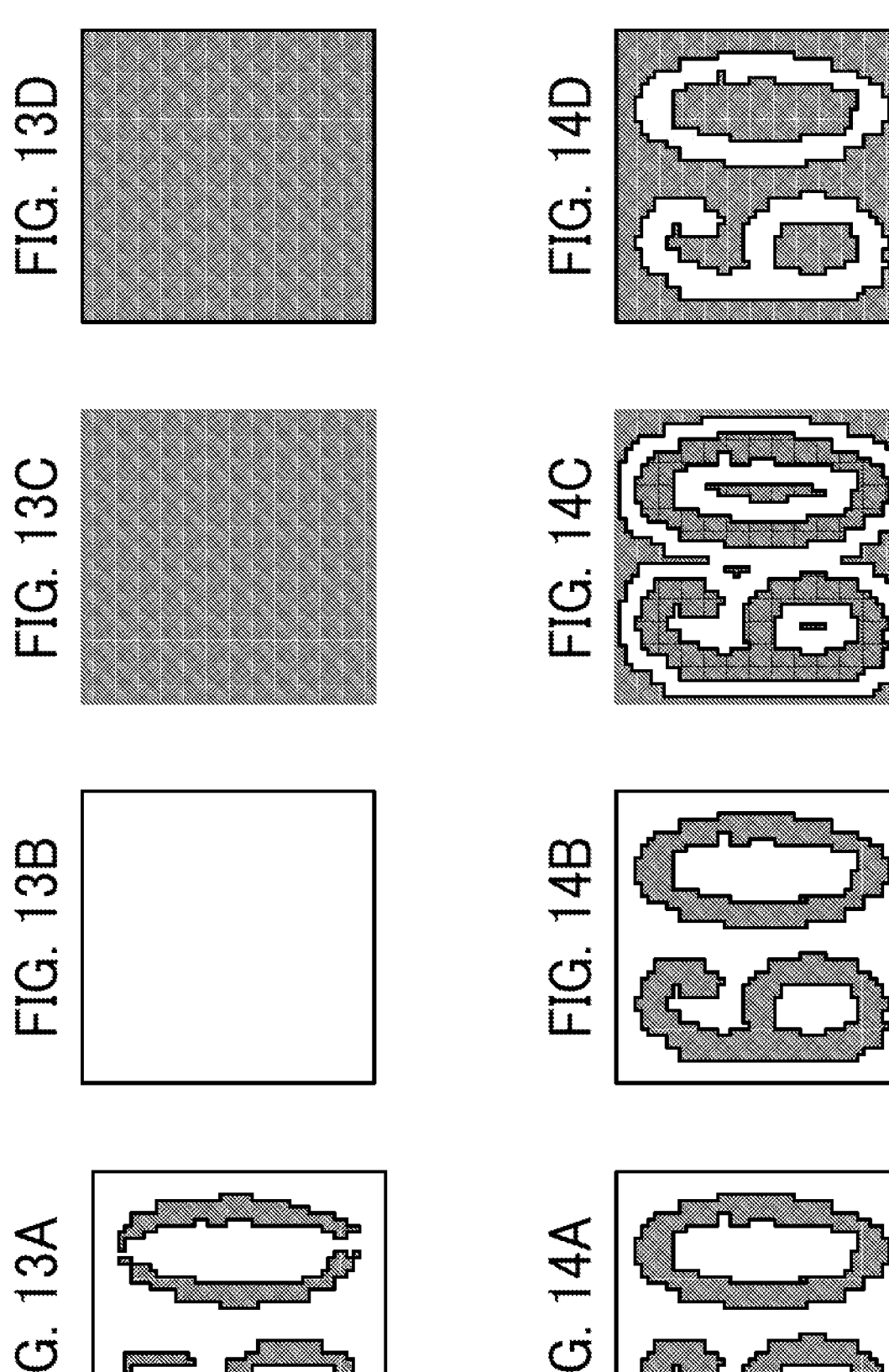

IMAGE PROCESSING APPARATUS, BINARIZATION METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2023-020529, filed on Feb. 14, 2023, in the Japan Patent Office, the entire disclosure of which is hereby incorporated by reference herein.

BACKGROUND

Technical Field

The present disclosure relates to an image processing apparatus, a binarization method, and a non-transitory recording medium.

Related Art

Image data read by an image processing apparatus using a scanner function may be a multivalued image. A multivalued image is an image having pixel values of three or more gradations, such as a grayscale image or a color image, unlike a black-and-white image having two types of pixel values of 1 and 0. The multivalued image is rich in gradations that can be expressed, but on the other hand, characters and the like may be buried in a gray background, which may make it difficult for a user to read the image or may reduce the accuracy of optical character recognition/reader (OCR) processing.

A technique of binarizing a multivalued image is known. For example, there is a technique of extracting a character region based on the luminances of individual pixels, converting the character region into an m-valued image in which the number of gradations is m ($m \geq 3$ and $m < n$), and determining a threshold value for binarizing the character region in accordance with whether a predetermined number of pixels of the m-valued image are present for each gradation.

In the above technique, however, white spots may be generated by binarization.

SUMMARY

According to an embodiment of the present disclosure, an image processing apparatus includes circuitry. The circuitry calculates, based on pixel values of an input image having M gradations, an N−1 first threshold value, M being greater than N, N being smaller than M and greater than 2. The circuitry compares the pixel values of the input image with the N−1 first threshold value to generate an N-valued image from the input image. The circuitry generates, based on pixel values of each of local regions of the input image and gradation values of each of local regions of the N-valued image, a binarized image obtained by binarizing the input image.

According to an embodiment of the present disclosure, a binarization method performed by an image processing apparatus includes calculating, based on pixel values of an input image having M gradations, an N−1 first threshold value, M being greater than N, N being smaller than M and greater than 2; comparing the pixel values of the input image with the N−1 first threshold value to generate an N-valued image from the input image; and generating, based on pixel values of each of local regions of the input image and gradation values of each of local regions of the N-valued image, a binarized image obtained by binarizing the input image.

According to an embodiment of the present disclosure, a non-transitory recording medium stores a plurality of instructions which, when executed by one or more processors, causes the one or more processors to perform a binarization method including calculating, based on pixel values of an input image having M gradations, an N−1 first threshold value, M being greater than N, N being smaller than M and greater than 2; comparing the pixel values of the input image with the N−1 first threshold value to generate an N-valued image from the input image; and generating, based on pixel values of each of local regions of the input image and gradation values of each of local regions of the N-valued image, a binarized image obtained by binarizing the input image.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 1 is a diagram for describing a comparison between processing results of global binarization and adaptive binarization;

FIG. 4 is a block diagram illustrating an example of functions of performing image processing for generating a binarized image (black-and-white image) from an input image;

FIG. 8 is a functional block diagram for describing an example of the functions of a binarization unit;

FIG. 9 is a diagram for describing a pixel of interest and a local region;

FIG. 10 is a flowchart for describing an example of a process in which an output unit performs binarization;

FIG. 12A, FIG. 12B, FIG. 12C, and FIG. 12D are views illustrating an example of four-valued images;

FIG. 13A, FIG. 13B, FIG. 13C, and FIG. 13D are views illustrating an example of binarized images obtained by binarizing the four-valued images in FIGS. 12A to 12D by an existing technique, respectively;

FIG. 14A, FIG. 14B, FIG. 14C, and FIG. 14D are views illustrating an example of binarized images obtained by binarizing the four-valued images in FIGS. 12A to 12D by binarization processing of the present embodiment, respectively;

Figure 2A:
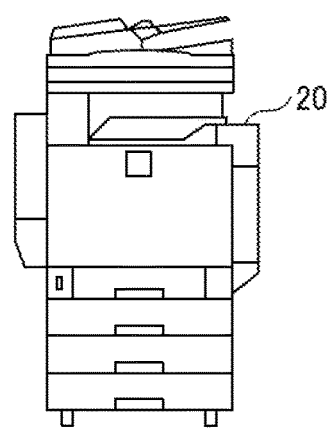
FIG. 2A is a diagram illustrating an image processing apparatus, which is an example of an apparatus that performs binarization processing.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, as an exemplary embodiment for carrying out the present disclosure, an image processing apparatus and a binarization method performed by the image processing apparatus will be described with reference to the drawings. Types of Binarization The types of binarization will be briefly described. Binarization includes global binarization and adaptive binarization.

Global binarization is a process of binarizing an entire image with the same threshold value. Global binarization includes a method using a fixed threshold value (simple binarization) and a method using, as a threshold value, a value calculated from a feature of an entire image in accordance with the image (typically, binarization using a discriminant analysis method).

Adaptive binarization is a process of performing binarization using, as a threshold value, a value obtained by adding an offset value to an average value of a local region, and is a process of performing binarization using a threshold value that varies according to a local region. The offset value may be a constant (for example, 5 to 20 in the case of 256 gradations), or may be determined by a ratio to the average value (for example, 10%).

Adaptive binarization is advantageous in that binarization can be performed such that a light character or a character on a dark background does not become illegible, but is disadvantageous in that switching of a threshold value within an image causes a defect such as a white spot that is not present in an input image.

Thus, conversion from a multivalued image to a binarized image involves inconvenience, for example, black pixels remain around a character on a dark background, or switching of binarization processing occurs in a background having a uniform density, resulting in an unnatural image having a conspicuous switching portion.

FIG. 1 is a diagram for describing a comparison between processing results of simple binarization and adaptive binarization. Part (a) of FIG. 1 illustrates an input image (multivalued image). An input image 110 includes a region 111 in which characters are written on a dark background. Simple binarization is described here. A problem of simple binarization is common to global binarization although the degrees are different.

Part (b) of FIG. 1 illustrates a processing result 112 obtained by performing simple binarization on the region 111. In the simple binarization, both the background and the characters are blackened, and thus the characters are illegible. Part (c) of FIG. 1 illustrates a processing result 113 obtained by performing adaptive binarization on the region 111. In the adaptive binarization, illegibility does not occur. However, in the processing result 113, black pixels (gray) remain in the background and characters are difficult to see.

The black pixels in the background in part (c) of FIG. 1 can be changed to white pixels depending on the setting of an offset value of adaptive binarization. However, a specific input image as illustrated in part (d) of FIG. 1 gives an unnatural processing result. In an input image 120 illustrated in part (d) of FIG. 1, a character region is covered with a gray region larger than the character region. Parts (e) and (f) of FIG. 1 illustrate results obtained by performing adaptive binarization on the input image 120. When an offset value is set so that the gray region of the background becomes white, complicated characters with a high density of black pixels have discontinuity and legibility deteriorates, as illustrated in part (e) of FIG. 1. On the other hand, when an offset value is set so as to increase legibility, a threshold value is adaptively switched in the background having a uniform density, so that white spots are derived and an unnatural binarized image is generated, as illustrated in part (f) of FIG. 1.

Outline of Binarization Processing According to Present Embodiment

At the time of binarizing a multivalued input image, the image processing apparatus according to the present embodiment: A. calculates, based on an overall feature of the input image having M gradations, an N−1 threshold value (M>N>2), and applies the N−1 threshold value to the input image to generate an N-valued image, which is the input image entirely N-valued; and B. generates, based on a feature of each of local regions of the input image and a feature of each of local regions of the N-valued image, a binarized image obtained by binarizing the entire input image.

"B" makes it possible to convert a light character or a character on a dark background into a more legible character. "A" makes it possible to generate an N-valued image with reduced unnatural noise or reduced white spots and reflect the result in B. Thus, it is possible to generate a binarized image with reduced noise or reduced white spots as a final output.

That is, the binarization method according to the present embodiment achieves both the conversion of a light character or a character on a dark background into a more legible character and the reduction of occurrence of noise or white spots.

In the present embodiment, a description will be given mainly assuming that M equals 256 and N equals 4. However, when N equals 8, for example, it is possible to perform binarization in which a white spot or the like is less likely to occur.

Terminology

Binarization refers to a process of converting a multigradation image into two colors of white and black (0, 1). 0 and 1 may be assigned to colors other than white and black as long as the number of colors is two.

M gradations refer to the number of gradations of an input image. In the present embodiment, 256 gradations will be described as an example.

N−1 refers to the number of threshold values smaller than N by 1 to create an N-valued image. In the present embodiment, an N-valued image is a four-valued image, for example.

A local region refers to a region including a predetermined number of pixels that include, at the center, a pixel of interest to be binarized. In the present embodiment, a local region is a region of 7×7 pixels.

Example Configuration

Figure 2B:
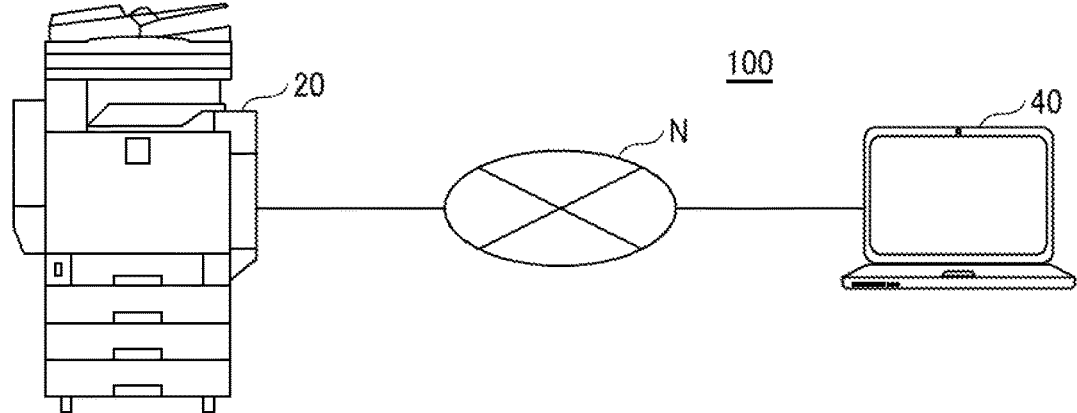
FIG. 2B and FIG. 2C are each a diagram illustrating an image processing system, which is an example of an apparatus that performs binarization processing.
Figure 2C:
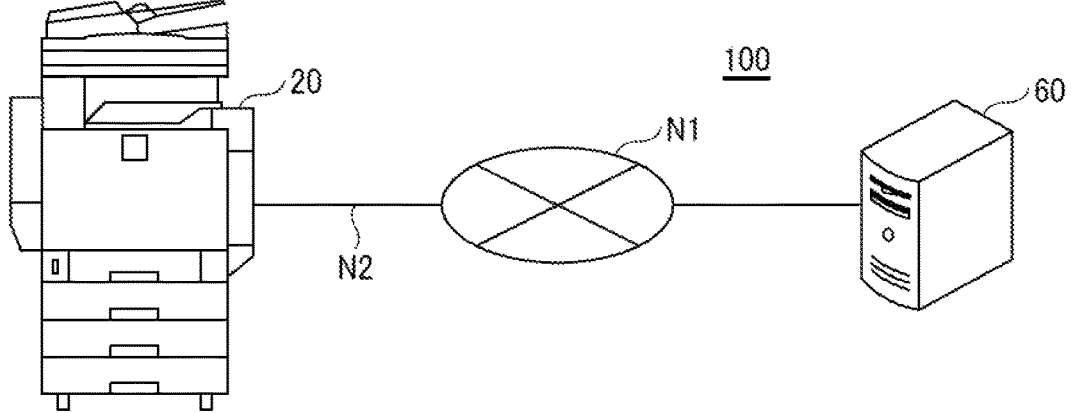

FIG. 2A illustrates an image processing apparatus 20, which is an example of an apparatus that performs binarization processing. FIGS. 2B and 2C each illustrate an image processing system 100, which is an example of an apparatus that performs binarization processing. The image processing apparatus 20 in FIG. 2A is to be used by a user and is, for example, an apparatus called a multifunction peripheral (MFP) having a plurality of different functions. The image processing apparatus 20 has at least a scanner function. A scanner is a device or function that converts an image, a document, or the like into a digital still image for communication or recording. In the present embodiment, the digital still image may be a color image or a monochrome image, and a multivalued image having higher gradation than a binary image can be generated as the digital still image. The digital still image may be a snapshot of a moving image.

The image processing apparatus 20 may have a facsimile function, a print function, a copy function, and the like in addition to the scanner function. The image processing apparatus 20 may be referred to as an image forming apparatus, a printing apparatus, a printer, a scanner apparatus, or the like.

The image processing apparatus 20 in FIG. 2A can scan a document image to generate a multi-gradation input image and perform binarization processing on the input image on a standalone basis. The binarization processing is performed as, for example, preprocessing of OCR. The binarization processing may be performed irrelevantly to OCR.

On the other hand, as illustrated in FIG. 2B, generation of an input image and binarization processing of the present embodiment may be performed by different apparatuses. FIG. 2B illustrates an example of the image processing system 100 in which an information processing apparatus 40 performs binarization processing. The image processing system 100 includes the information processing apparatus 40 and the image processing apparatus 20. The information processing apparatus 40 and the image processing apparatus 20 are communicably connected to each other via a local area network (LAN) in a facility, Wi-Fi®, or a universal serial bus (USB) cable.

In response to a user setting a document on the image processing apparatus 20 and executing scanning, the image processing apparatus 20 transmits a multi-gradation input image to the information processing apparatus 40 via a network N. The information processing apparatus 40 can receive the multi-gradation input image generated by the image processing apparatus 20 scanning the document, and perform binarization processing on the input image.

Alternatively, as illustrated in FIG. 2C, binarization processing may be executed as a part of workflow processing. A workflow is a series of processes in which a plurality of processes (for example, scanning, storing in the cloud, or email transmission) are executed in combination. In a known service, for example, an information processing system 60 performs predetermined processing on image data generated by a device reading a document, and then stores the image data in the cloud or transmits the image data by email.

FIG. 2C illustrates the image processing system 100 that executes a workflow. The image processing system 100 includes the information processing system 60 and the image processing apparatus 20. The information processing apparatus 40 may or may not be included in the image processing system 100. The information processing system 60 and the image processing apparatus 20 are communicably connected to each other via a wide-area network N1 such as the Internet. The image processing apparatus 20 is installed in a facility such as a company and is connected to a network N2 installed in the facility. The network N2 may be a LAN, Wi-Fi®, wide-area Ethernet®, a mobile phone network such as 4G, 5G, or 6G, or the like.

The information processing system 60 may be implemented by one or more computers. The information processing system 60 may be implemented by cloud computing or may be implemented by a single information processing apparatus. Cloud computing refers to a style in which network resources are used without concern for specific hardware resources. The information processing system 60 may be present on the Internet or on the premises.

The image processing apparatus 20 and the information processing system 60 may execute a web application. A web application is an application operated by cooperation between a program in a programming language (for example, JavaScript®) operated on a web browser and a program on a web server side. On the other hand, an application that is not executed unless the application is installed in the image processing apparatus 20 is referred to as a native application. In the present embodiment, an application executed by the image processing apparatus 20 may be a web application or a native application.

The information processing system 60 generates screen information for the image processing apparatus 20 to display a screen of a web application. The screen information is a program described in HyperText Markup Language (HTML), Extensible Markup Language (XML), a script language, Cascading Style Sheet (CSS), or the like. The structure of a web page is mainly specified by HTML, the operation of the web page is defined by a script language, and the style of the web page is specified by CSS.

In the configuration illustrated in FIG. 2C, the image processing apparatus 20 generates an input image by the scanner function, performs binarization processing, and transmits the input image to the image processing system 60 via the networks N1 and N2. The information processing system 60 performs, for example, OCR processing, and transmits the input image by email or stores the input image in the cloud.

Alternatively, the binarization processing may be performed by the information processing system 60. The image processing apparatus 20 generates an input image by the scanner function, and transmits the input image to the information processing system 60 via the networks N1 and N2. The information processing system 60 performs binarization processing on the received input image and executes the subsequent workflow.

The information processing apparatus 40 can accept execution of a workflow, but may be used by a user to perform settings related to the workflow (such as license assignment and initial settings).

The input image on which the information processing apparatus 40 in FIG. 2B or the information processing system 60 in FIG. 2C performs binarization processing is not necessarily an image obtained through scanning performed by the image processing apparatus 20. For example, the image processing apparatus 20 may be a digital camera or a smartphone, and the information processing apparatus 40 or the information processing system 60 may perform binarization processing on an input image generated through image capturing performed on a document or the like by the digital camera or the smartphone. The information processing apparatus 40 or the information processing system 60 can perform binarization processing on an image on a network.

The following description will be given under the assumption that the image processing apparatus 20 in FIG. 2A performs binarization processing, unless otherwise specified.

Example of Hardware Configuration

Figure 3:
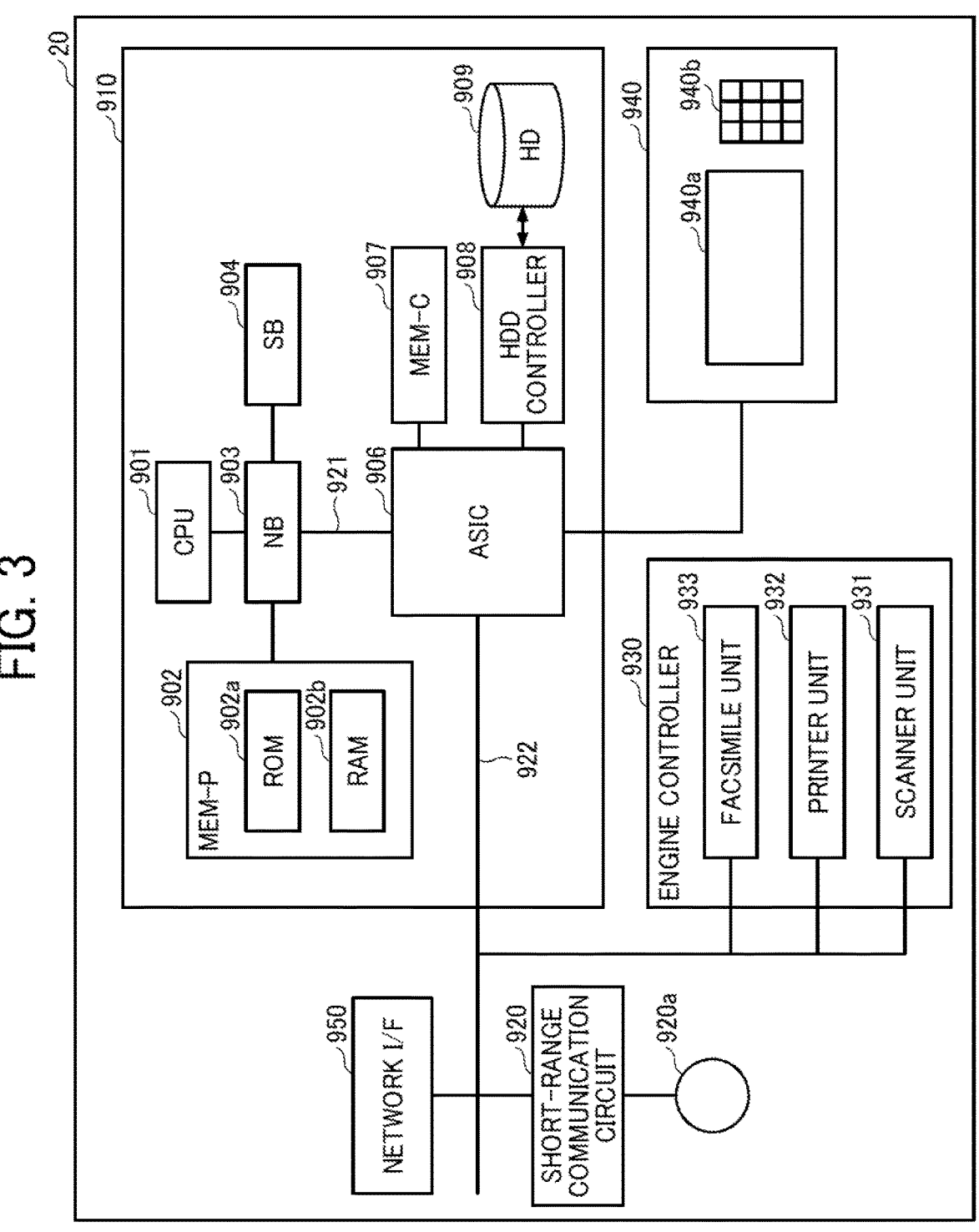
FIG. 3 is a diagram illustrating an example of a hardware configuration of the image processing apparatus.

FIG. 3 is a diagram illustrating an example of a hardware configuration of the image processing apparatus 20 according to an embodiment of the present disclosure. As illustrated in FIG. 3, the image processing apparatus 20 includes a controller 910, a short-range communication circuit 920, an engine controller 930, an operation panel 940, and a network interface (I/F) 950. The image processing apparatus 20 may be an image forming apparatus, a multifunction peripheral, a multifunction product, or a multifunction printer.

The controller 910 includes a central processing unit (CPU) 901 serving as a main unit of a computer, a system memory (MEM-P) 902, a north bridge (NB) 903, a south bridge (SB) 904, an application specific integrated circuit (ASIC) 906, a local memory (MEM-C) 907, a hard disk drive (HDD) controller 908, and a hard disk (HD) 909. The NB 903 and the ASIC 906 are connected to each other by an accelerated graphics port (AGP) bus 921.

The CPU 901 controls the entire image processing apparatus 20. The NB 903 is a bridge for connecting the CPU 901 to the MEM-P 902, the SB 904, and the AGP bus 921. The NB 903 includes a memory controller that controls read from or write to the MEM-P 902, a peripheral component interconnect (PCI) master, and an AGP target.

The MEM-P 902 includes a read-only memory (ROM) 902a serving as a memory for storing a program or data for implementing various functions of the controller 910. The MEM-P 902 further includes a random access memory (RAM) 902b serving as a memory for deploying a program or data or as a drawing memory for memory printing. The program stored in the RAM 902b may be provided by being recorded on a computer-readable recording medium, such as a compact disc-read only memory (CD-ROM), a compact disc-recordable (CD-R), or a digital versatile disc (DVD), in an installable or executable file format.

The SB 904 is a bridge for connecting the NB 903 to a PCI device or a peripheral device. The ASIC 906 is an integrated circuit (IC) that includes hardware elements for image processing and that is for use in image processing, and serves as a bridge for connecting the AGP bus 921, a PCI bus 922, the HDD controller 908, and the MEM-C 907 to each other. The ASIC 906 includes a PCI target, an AGP master, an arbiter (ARB) serving as a core of the ASIC 906, a memory controller that controls the MEM-C 907, a plurality of direct memory access controllers (DMACs) that perform rotation or the like of image data by hardware logic, and a PCI unit that transmits data to and receives data from a scanner unit 931, a printer unit 932, and a facsimile unit 933 through the PCI bus 922. The ASIC 906 may be connected to a USB interface or an Institute of Electrical and Electronics Engineers 1394 (IEEE 1394) interface.

The short-range communication circuit 920 has a card reader 920a for reading user authentication information or the like stored in an IC card or the like.

The operation panel 940 includes a touch panel 940a and a numeric keypad 940b for receiving an input from a user. The touch panel 940a displays a setting screen and the like of the image processing apparatus 20.

Functions

Next, the binarization function of the image processing apparatus 20 will be described in detail with reference to FIG. 4. FIG. 4 is a block diagram illustrating functions of performing image processing for generating a binarized image (black-and-white image) from an input image. The input image is an RGB image and has 256 gradations in which each color has 8 bits. Alternatively, the input image may have a higher gradation, for example, each color has 10 bits, or a lower gradation.

The image processing apparatus 20 includes a smoothing unit 11, a gray processing unit 12, and a multivalued image processing unit 13. The multivalued image processing unit 13 includes a threshold value calculation unit 14, an N-value conversion unit 15, and a binarization unit 16. These functional units included in the image processing apparatus 20 are functions implemented by the CPU 901 executing instructions included in one or more programs installed in the image processing apparatus 20. Alternatively, these functional units may be implemented by an ASIC, a digital signal processor (DSP), a field programmable gate array (FPGA), a hardware circuit module, or the like.

The smoothing unit 11 smooths an input image by using a spatial filter. The spatial filter may be an averaging filter, a Gaussian filter, a median filter, a max filter, a min filter, or the like. These filters may be selectively used as appropriate. Smoothing is effective in reducing an influence of noise and reducing halftone dots remaining as black dots after binarization.

The gray processing unit 12 converts an input image (RGB image) into a grayscale image (8 bits, 256 gradations) by using a conversion formula for converting RGB into luminance. The gray processing unit 12 converts an input image into a grayscale image by using, for example, a conversion formula for conversion into a Y signal of YCbCr used in Joint Photographic Experts Group (JPEG). In luminance Y, 0 corresponds to black and 255 corresponds to white. Thus, the gray processing unit 12 inverts black and white to convert the luminance Y into an image signal in which 0 corresponds to white and 255 corresponds to black. This processing operation is performed for the convenience of subsequent processing.

The multivalued image processing unit 13 converts the grayscale image of 8 bits and 256 gradations obtained through grayscale conversion into a black-and-white image of 1 bit and 2 gradations, and outputs the black-and-white image. In the present embodiment, a description is given under the assumption that the image is converted into a black-and-white image in which 0 corresponds to white and 1 corresponds to black. However, when black and white are not inverted in the preceding stage (the gray processing unit 12), the data logic is reversed in the following description.

The threshold value calculation unit 14 calculates three threshold values (in the case of a four-valued image, N=4 and thus N−1=3) from a feature of the entire input image. A method for calculating the threshold values will be described below.

The N-value conversion unit 15 converts individual pixel values from 256 gradations into 4 gradations (a four-valued image) by applying the three threshold values calculated by the threshold value calculation unit 14.

The binarization unit 16 converts a binarization result of a pixel of interest into 0 or 1, based on a feature of a local region of the grayscale image and a feature of a local region of the four-valued image, and outputs the result. The binarization unit 16 repeatedly performs the same processing while shifting the position of the pixel of interest of the grayscale image or the four-valued image by one pixel.

Calculation of Threshold Values

Figures 5, 6:
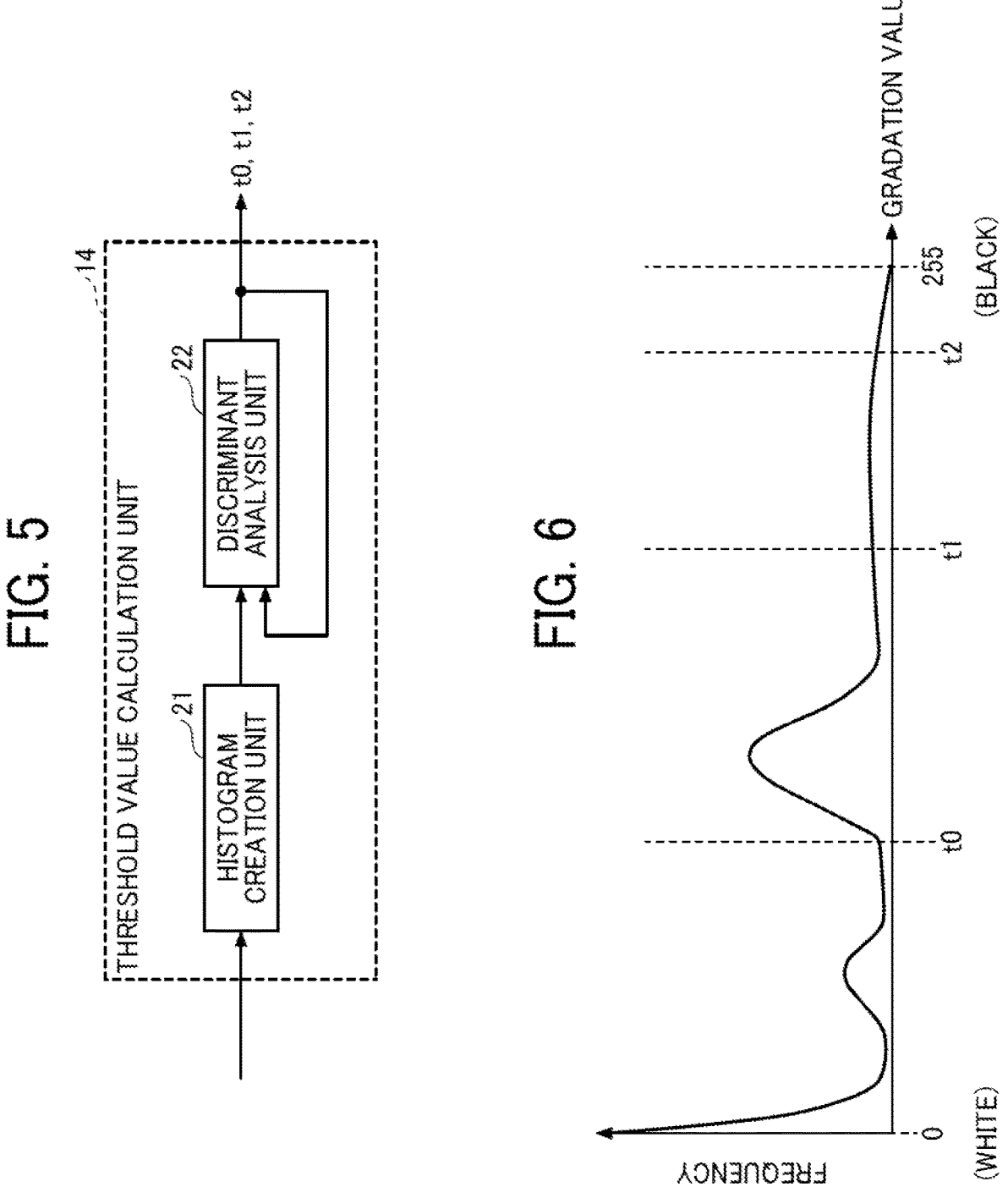
FIG. 5 is a functional block diagram for describing an example of the functions of a threshold value calculation unit.
FIG. 6 illustrates an example of a histogram created by a histogram creation unit.

Next, a method for calculating threshold values performed by the threshold value calculation unit 14 will be described with reference to FIGS. 5 to 7. FIG. 5 is a functional block diagram for describing the functions of the threshold value calculation unit 14. The threshold value calculation unit 14 includes a histogram creation unit 21 and a discriminant analysis unit 22.

The histogram creation unit 21 creates a frequency distribution (histogram) for individual gradations of an input image.

An example of the histogram is illustrated in FIG. 6. Creating of the histogram enables the discriminant analysis unit 22 to easily calculate three threshold values. The discriminant analysis unit 22 calculates the three threshold values by performing predetermined processing on the histogram. The details will be described with reference to FIG. 7.

FIG. 6 illustrates an example of the histogram created by the histogram creation unit 21. As illustrated in FIG. 6, the horizontal axis represents pixel value (0 to 256) and the vertical axis represents frequency (the number of pixels for each pixel value). The discriminant analysis unit 22 easily detects, as a threshold value, a minimum value of the histogram or a value near the minimum value. Thus, the N-value conversion unit 15 easily performs quaternarization to convert similar pixel values into the same gradation value. FIG. 6 illustrates threshold values t0, t1, and t2 (an example of a first threshold value) determined by the discriminant analysis unit 22.

Figure 7:
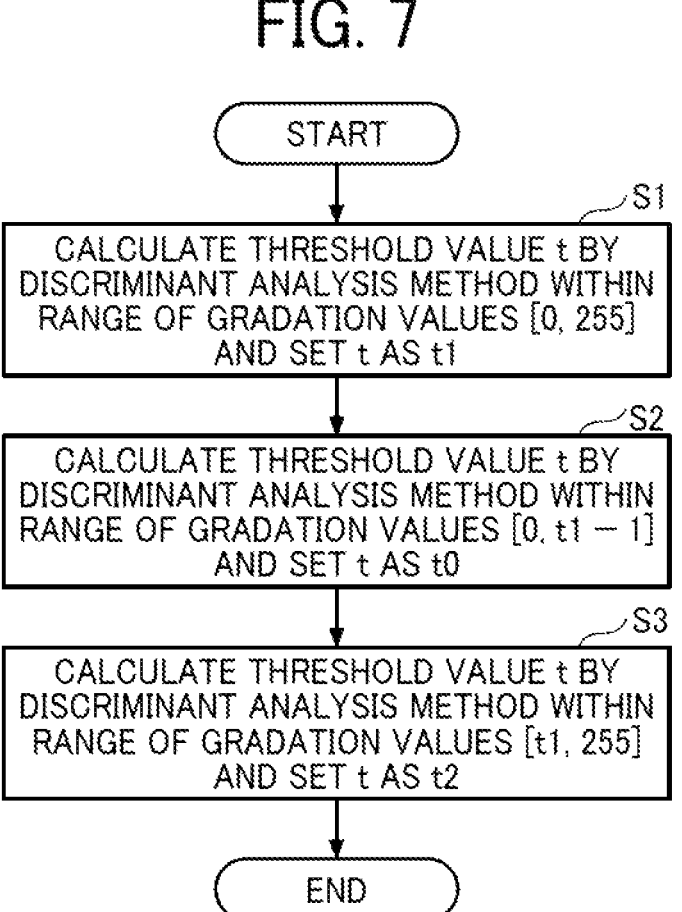
FIG. 7 is a flowchart for describing an example of a process in which a discriminant analysis unit determines three threshold values.

FIG. 7 is a flowchart for describing a process in which the discriminant analysis unit 22 determines the three threshold values t0, t1, and t2. FIG. 7 illustrates a loop process of the discriminant analysis unit 22 illustrated in FIG. 5. The discriminant analysis unit 22 performs a discriminant analysis method for calculating one threshold value three times by changing the reference range of the histogram.

The discriminant analysis method is a method for obtaining a threshold value at which the value of separation metrics is maximum. The separation metrics is calculated using a between-class variance and a within-class variance. The discriminant analysis method will be described below.

In the first loop, the discriminant analysis unit 22 calculates the threshold value t1 by applying the discriminant analysis method within the range of gradation values [0, 255], that is, in the entire histogram (S1).

In the second loop, the discriminant analysis unit 22 calculates the threshold t0 by applying the discriminant analysis method within the range of gradation values [0, t1−1], that is, in a partial histogram on the white side (S2).

In the third loop, the discriminant analysis unit 22 calculates the threshold t2 by applying the discriminant analysis method within the range of gradation values [t1, 255], that is, in a partial histogram on the black side (S3).

Discriminant Analysis Method

The discriminant analysis method will be described. It is assumed that the discriminant analysis unit 22 obtains the threshold value t from $0{\leq}t{\leq}255$. The range of $0{\leq}t$ is a white class, in which the number of pixels is $\omega_1$, the mean is $m_1$, and the variance is $\delta_1$. Similarly, the range of $t{\leq}255$ is a black class, in which the number of pixels is $\omega_2$, the mean is $m_2$, and the variance is $\delta_2$. In the entire image, the number of pixels is $\omega_r$, the mean is $m_r$, and the variance is $\delta_r$.

The within-class variance is defined by Expression (1).

$$\delta_\omega^2 = \frac{\omega_1 \delta_1^2 + \omega_2 \delta_2^2}{\omega_1 + \omega_2} \tag{1}$$

The between-class variance is defined by Expression (2).

$$\delta_b^2 = \frac{\omega_1 \omega_2 (m_1 - m_2)^2}{(\omega_1 + \omega_2)^2} \tag{2}$$

The total variance is defined by Expression (3).

$$\delta_t = \delta_b^2 + \delta_\omega^2 \tag{3}$$

The separation metrics is defined by Expression (4).

$$\frac{\delta_b^2}{\delta_\omega^2} = \frac{\delta_b^2}{\delta_t^2 - \delta_b^2} \tag{4}$$

The threshold value calculation unit 14 may calculate the threshold value t at which Expression (4) is maximum. The total variance is constant regardless of a threshold value, and thus the threshold value at which Expression (5) is substantially maximum is calculated.

$$\omega_1 \omega_2 (m_1 - m_2)^2 \tag{5}$$

Quaternarization

Next, quaternarization processing will be described. The N-value conversion unit 15 uses the threshold values t0, t1, and t2 to convert a grayscale image of 256 gradations into a four-valued image in the following manner.

(i) When the pixel value of the pixel of interest is within the range of [0, t0−1] on the grayscale image, the N-value conversion unit 15 performs quaternarization such that the pixel of interest has a gradation value of 0.

(ii) When the pixel value of the pixel of interest is within the range of [t0, t1−1] on the grayscale image, the N-value conversion unit 15 performs quaternarization such that the pixel of interest has a gradation value of 1.

(iii) When the pixel value of the pixel of interest is within the range of [t1, t2−1] on the grayscale image, the N-value conversion unit 15 performs quaternarization such that the pixel of interest has a gradation value of 2.

(iv) When the pixel value of the pixel of interest is within the range of [t2, 255] on the grayscale image, the N-value conversion unit 15 performs quaternarization such that the pixel of interest has a gradation value of 3.

Here, a description is given under the assumption that the threshold values calculated by the discriminant analysis method are applied as they are, but the N-value conversion unit 15 may perform quaternarization after adding an offset value given by a constant to the threshold values t0 to t2 as is commonly performed.

Binarization

Next, binarization processing will be described with reference to FIGS. 8 to 11. FIG. 8 is a functional block diagram for describing the functions of the binarization unit 16. The binarization unit 16 includes an average value calculation unit 31, a minimum value calculation unit 32, a number-of-pixels counting unit 33, and an output unit 34. The average value calculation unit 31 and the minimum value calculation unit 32 receive a grayscale image of 256 gradations. The number-of-pixels counting unit 33 receives a four-valued image of 4 gradations.

FIG. 9 is a diagram for describing a pixel of interest and a local region. In the present embodiment, 7×7 pixels including a pixel of interest at the center form a local region. The local region is formed of 7×7 pixels in one example, and the local region may be smaller or larger.

The average value calculation unit 31 refers to the local region (7×7 pixels) of the grayscale image of 256 gradations to calculate an average value of the 49 pixels.

The minimum value calculation unit 32 refers to the local region (7×7 pixels) of the input image to calculate a minimum value of the 49 pixels. The difference between the average value and the minimum value is used to determine whether an edge is present. An edge refers to a boundary between a bright portion (white) and a dark portion (black) in the image.

The number-of-pixels counting unit 33 refers to the local region (7×7 pixels) of the input image of 4 gradations to count the number of pixels for each of the gradation values 0, 1, 2, and 3. The number of pixels having a gradation value of 0 is represented by cnt0, the number of pixels having a gradation value of 1 is represented by cnt1, the number of pixels having a gradation value of 2 is represented by cnt2, and the number of pixels having a gradation value of 3 is represented by cnt3.

FIGS. 10 to 15D are diagrams for describing the flow of binarization and conditions 1 to 3. The conditions 1 to 3 are conditions for determining whether to convert the pixel of interest of a grayscale image into 0 or 1. The conditions 1 to 3 will be described in detail below.

Figure 10:
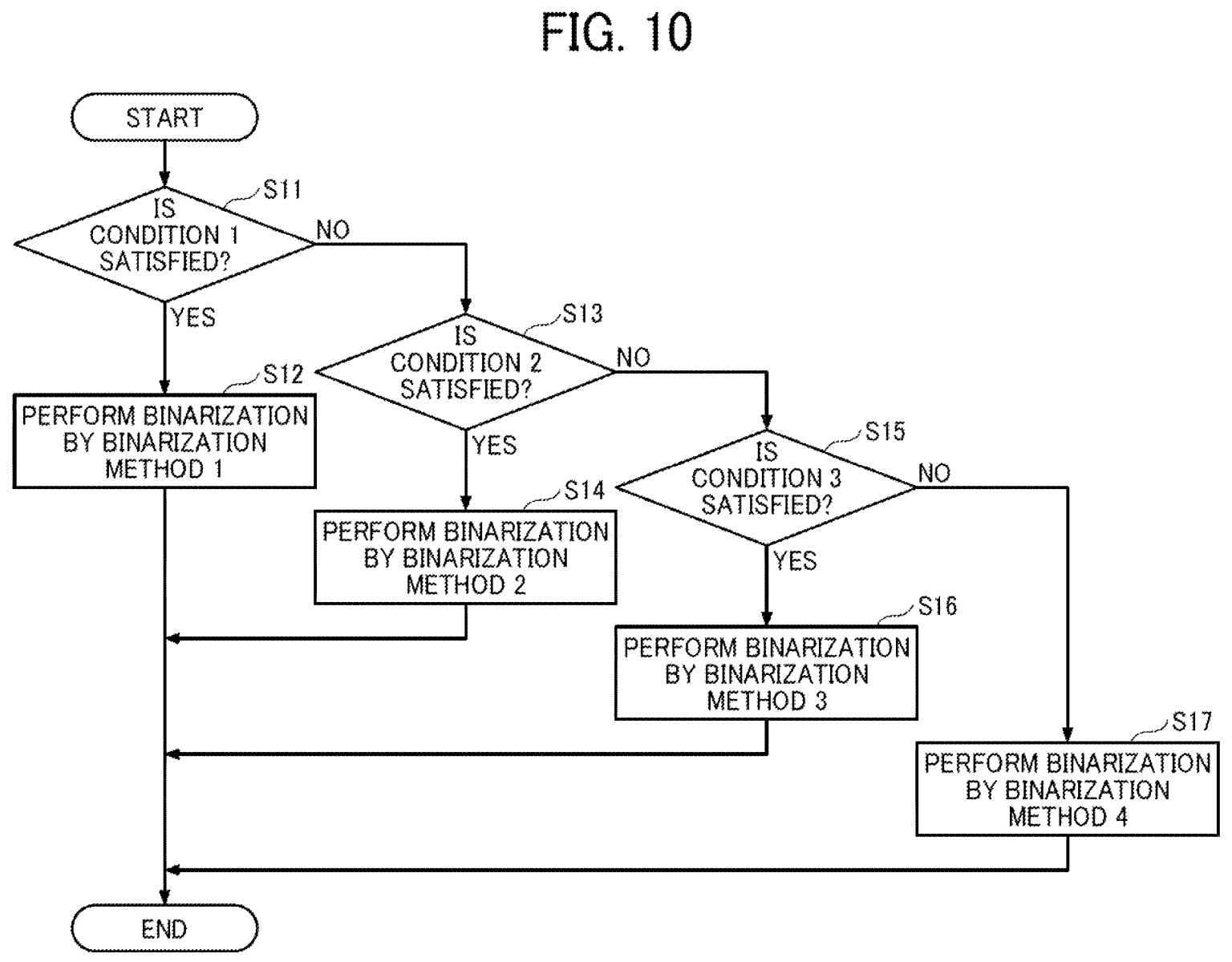

FIG. 10 is a flowchart for describing a process in which the output unit 34 performs binarization. The output unit 34 determines whether the condition 1 (an example of a first condition) is satisfied (S11).

When the determination in step S11 is Yes, the output unit 34 performs binarization by a binarization method 1 (S12). The binarization method 1 will be described below.

When the determination in step S11 is No, the output unit 34 determines whether the condition 2 (an example of a second condition) is satisfied (S13).

When the determination in step S13 is Yes, the output unit 34 performs binarization by a binarization method 2 (S14). The binarization method 2 will be described below.

When the determination in step S13 is No, the output unit 34 determines whether a condition 3 (an example of a third condition) is satisfied (S15).

When the determination in step S15 is Yes, the output unit 34 performs binarization by a binarization method 3 (S16). The binarization method 3 will be described below.

When the determination in step S15 is No, the output unit 34 performs binarization by a binarization method 4 (S17). The binarization method 4 will be described below.

In FIG. 10, whether the condition 3 is satisfied is determined after whether the condition 2 is satisfied is determined. Alternatively, whether the condition 3 is satisfied may be determined before whether the condition 2 is satisfied is determined.

Condition 1

Figure 11:
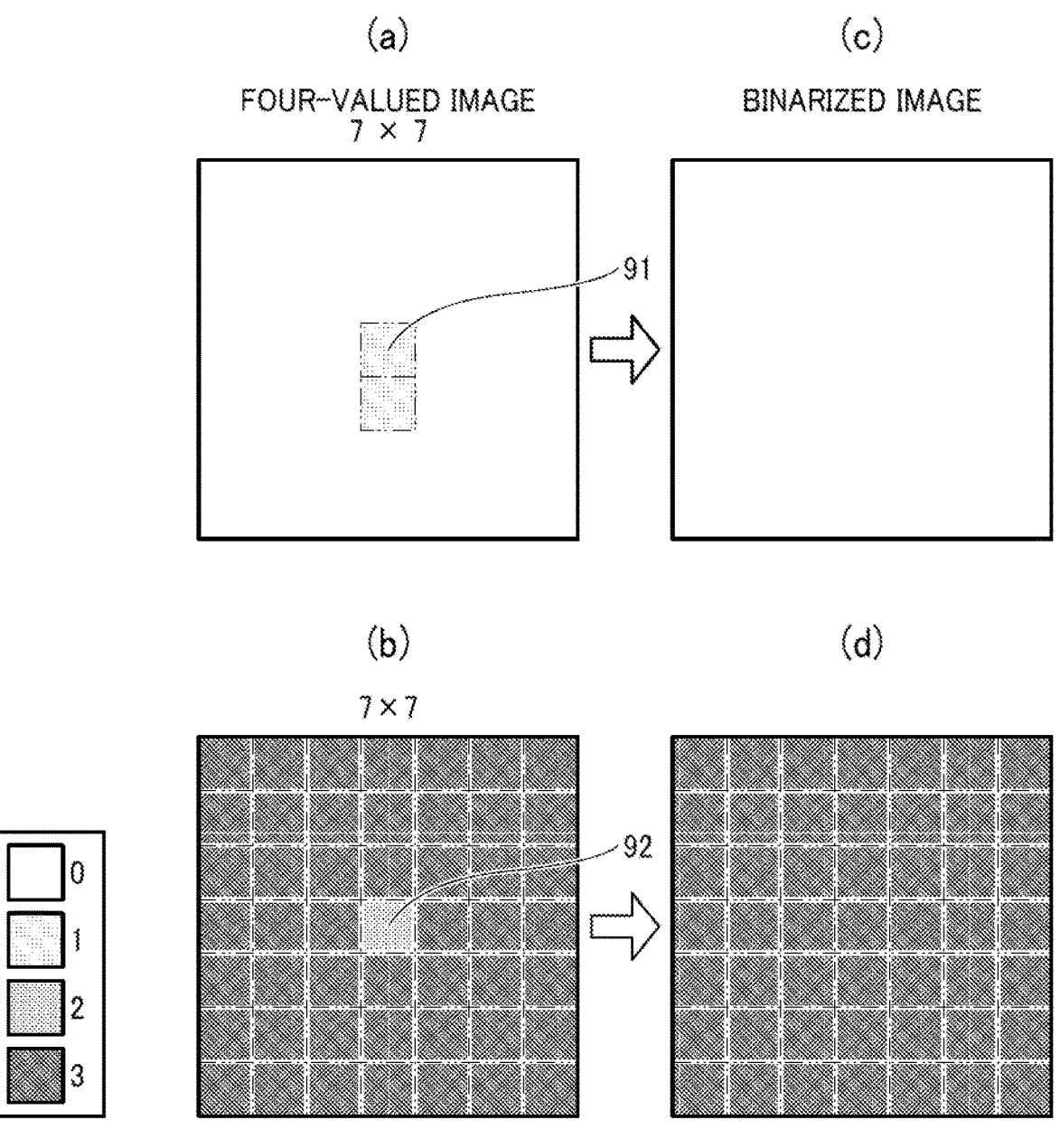
FIG. 11 is a diagram for describing a condition 1.

FIG. 11 is a diagram for describing the condition 1.

The condition 1 is that a count result of the number of pixels having a gradation value equal to the gradation value of a pixel of interest in a four-valued image is smaller than or equal to 2 and that two of cnt0, cnt1, cnt2, and cnt3 have a value of 1 or more (the number of types of gradation values in the local region is two). That is, the pixels around the pixel of interest (within the local region) have the same gradation, and the number of pixels having a gradation value equal to the gradation value of the pixel of interest around the pixel of interest is one at the maximum. Thus, the condition 1 is a condition for detecting isolated point noise.

The count result of the number of pixels having a gradation value equal to the gradation value of the pixel of interest being 2 (an example of a second threshold value) or less is an example, and this threshold value may be 3 or another value. The threshold value of 2 is applied to the case where the local region is formed of 49 pixels. When the local region is larger, the threshold value to be compared with the count result of the number of pixels having a gradation value equal to the gradation value of the pixel of interest increases. When the local region is smaller, the threshold value to be compared with the count result of the number of pixels having a gradation value equal to the gradation value of the pixel of interest decreases.

In part (a) of FIG. 11, the count result of the number of pixels having a gradation value equal to the gradation value of a pixel of interest 91 (gradation value 1) is 2. In addition, cnt0=47, cnt1=2, cnt2=0, and cnt3=0 hold. Thus, the local region in part (a) of FIG. 11 satisfies the condition 1.

In part (b) of FIG. 11, the count result of the number of pixels having a gradation value equal to the gradation value of a pixel of interest 92 (gradation value 2) is 1. In addition, cnt0=0, cnt1=0, cnt2=1, and cnt3=48 hold. Thus, the local region in part (b) of FIG. 11 satisfies the condition 1.

When the condition 1 is satisfied, the output unit 34 performs binarization by the binarization method 1. The binarization method 1 is a process in which the binarization result of the pixel of interest is 0 when another gradation value different from the gradation value of the pixel of interest in the four-valued image is 0 or 1, and the binarization result of the pixel of interest is 1 when another gradation value different from the gradation value of the pixel of interest in the four-valued image is 2 or 3. That is, the output unit 34 binarizes the pixel of interest in the four-valued image such that the pixel of interest and the surrounding pixels have the same gradation value. Because the number of pixels having a gradation value equal to the gradation value of the pixel of interest is two or less, the gradation value of the pixel of interest is changed to a majority gradation value in the local region. Thus, the output unit 34 can eliminate isolated point noise.

Part (c) of FIG. 11 illustrates a binarized image obtained by binarizing the four-valued image in part (a) of FIG. 11 by the binarization method 1. In part (a) of FIG. 11, another gradation value different from the gradation value of the pixel of interest 91 is 0, and thus the binarization result of the pixel of interest 91 is 0 in part (c) of FIG. 11. The local region in part (c) of FIG. 11 is in a state in which the pixel immediately below the pixel of interest 91 has been binarized in a similar manner in the next processing.

Part (d) of FIG. 11 illustrates a binarized image obtained by binarizing the four-valued image in part (b) FIG. 11 by the binarization method 1. In part (b) of FIG. 11, another gradation value different from the gradation value of the pixel of interest 92 is 3, and thus the binarization result of the pixel of interest 92 is 1 in part (d) of FIG. 11.

Condition 2

The condition 2 is that (i) the gradation value of a pixel of interest in a four-valued image is 1 (an example of a first predetermined value), and that (ii) the absolute value of a difference between an average value and a minimum value of a local region in a grayscale image is greater than or equal to a threshold value (an example of a third threshold value). The threshold value may be 10, for example, or may be less than 10 or more than 10.

According to the condition (i) in the condition 2, the pixel of interest is to be relatively light. The condition (ii) is intended to exclude the pixel of interest which is light and which is not to be converted into black. The condition (ii) in the condition 2 is a condition for preventing a noise-like object (the absolute value of the difference between the average value and the minimum value is not equal to or larger than a threshold value (for example, 10 or more)) on a white background, which is not to appear in black in a binarization result, from appearing in black. An example of a noise-like object is an edge having a relatively gradual density change. For example, a noise-like object is a line generated by folding a sheet of paper of a scanned document (excluded by the condition 2).

In other words, the condition 2 is a condition for converting an edge that is not noise but is conspicuous to some extent into black. Thus, according to the condition 2, an edge having a relatively gradual density change can be converted into 0 (noise removal), and an edge that is not noise but is conspicuous to some extent can be converted into 1.

When the condition 2 is satisfied, the output unit 34 binarizes the grayscale image by the binarization method 2. The binarization method 2 is adaptive binarization. Adaptive binarization binarizes the pixel of interest by using, as a threshold value, an offset value given by the sum of an average value and a constant. The threshold value of the binarization method 2 is smaller than in the condition 3 described below, in order to convert an edge that is not noise into black (for example, in order to convert a light character on a white background into a more legible character).

Condition 3

The condition 3 is that the gradation value of a pixel of interest is 2 (an example of a second predetermined value) in a four-valued image.

The condition 3 is, for example, a condition for binarizing an originally white pixel (for example, a white background) on a gray background into 0.

When the condition 3 is satisfied, the output unit 34 binarizes the grayscale image by the binarization method 3. The binarization method 3 is adaptive binarization. The threshold value applied in the binarization method 3 is set to a value larger than the threshold value of the binarization method 2 in order to convert a solid-white character into a more legible character. As described above, the offset value applied in the binarization method 2 is set to a relatively small value in order to convert a light character on a white background into a more legible character (for example, into a black character).

Case Where None of Conditions 1 to 3 Is Satisfied

When the pixel of interest satisfies none of the conditions 1 to 3, the output unit 34 binarizes the pixel of interest by the binarization method 4. An example of a case where none of the conditions 1 to 3 is satisfied (not an isolated point noise, not an edge conspicuous to some extent, or not a gray background) is a case where all the pixels in a local region have the same gradation value in a four-valued image.

In the binarization method 4, the binarization result is 0 when the gradation value of the pixel of interest in the four-valued image is 0 or 1, and the binarization result is 1 when the gradation value of the pixel of interest in the four-valued image is 2 or 3. This processing operation corresponds to binarizing the pixel value of the pixel of interest into a value uniquely determined with respect to a gradation value in the local region. That is, the pixel of interest that does not satisfy any of the conditions 1 to 3 is forcibly converted into 1 or 0. The binarization method 4 generates a binarized image that is the same as a binarized image obtained by binarizing a grayscale image with the threshold value t1 calculated by the discriminant analysis method.

Effect of Binarization Obtained in Accordance with Condition 2 or Condition 3

FIGS. 12A to 12D illustrate an example of four-valued images, and FIGS. 13A to 13D illustrate binarized images obtained by binarizing the four-valued images in FIGS. 12A to 12D by an existing technique, respectively. When the four-valued images in FIGS. 12A to 12D are binarized by the discriminant analysis method, which is an existing binarization technique (i.e., all the pixels are binarized using the threshold value t1), the binarized images in FIGS. 13A to 13D are obtained. The binarization results in FIGS. 13A to 13D have the following defects.

Figures 12A, 12B, 12C, 12D:
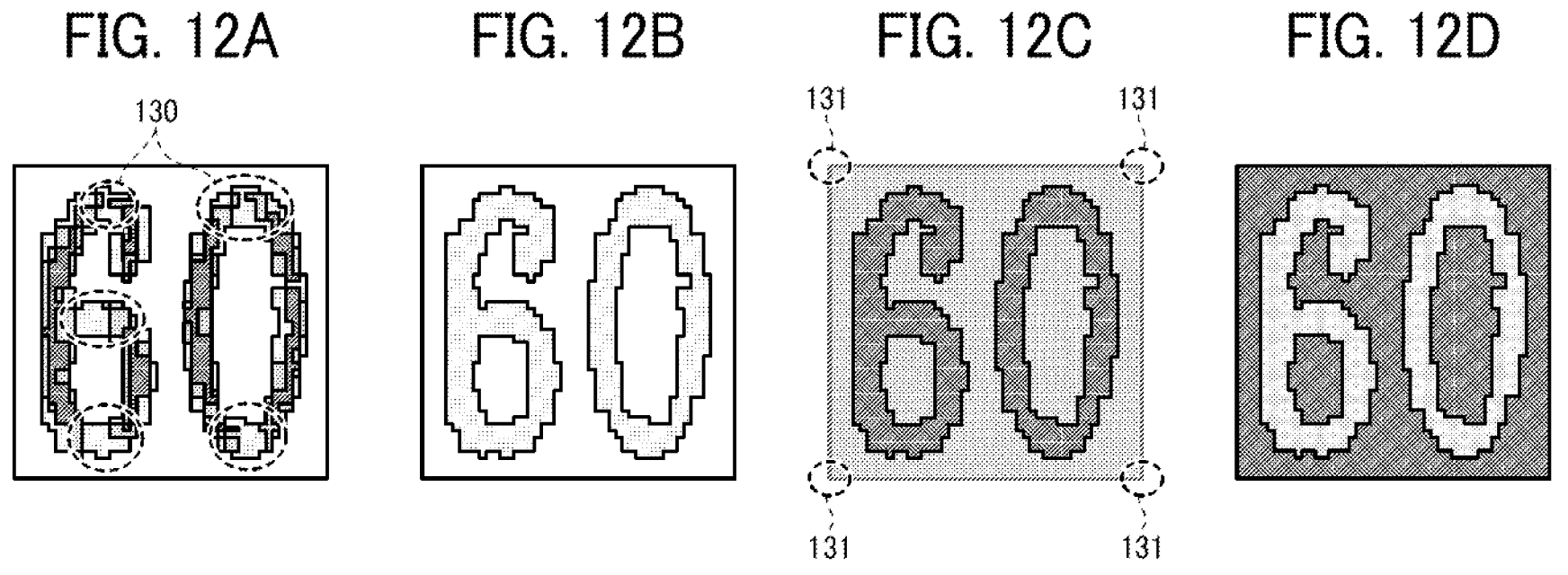

In FIG. 12A, light portions 130 are binarized into white pixels, and the characters (numeral "60") are not sufficiently legible as illustrated in FIG. 13A.

In FIG. 12B, the entire region of the characters is light, and thus binarization makes the entire region of the characters white (the characters disappear) as illustrated in FIG. 13B.

In FIGS. 12C and 12D, the background is dark, and thus binarization makes the entire image black as illustrated in FIGS. 13C and 13D.

On the other hand, FIGS. 14A to 14D illustrate binarized images obtained by binarizing the four-valued images in FIGS. 12A to 12D by the binarization method of the present embodiment, respectively. Referring to FIG. 14A, the light portions 130 in FIG. 12A are converted into clear black portions as a result of binarization performed in accordance with the condition 2. That is, in the four-valued image in FIG. 12A, pixels in which the gradation value of the pixel of interest is 1 (the light portions 130) satisfy the condition 2 because black pixels are present therearound. The threshold value of the binarization method 2 is relatively small, and thus the pixels in which the gradation value of the pixel of interest is 1 become 1 (black) as a result of binarization processing.

Similarly, in FIG. 14B, light characters (having a gradation value of 1) are converted into clear black characters as a result of binarization performed in accordance with the condition 2. In the four-valued image in FIG. 12B, pixels in which the gradation value of the pixel of interest is 1 (the pixels corresponding to the numeral 60) satisfy the condition 2 because a white background is present therearound. The threshold value of the binarization method 2 is relatively small, and thus the pixels in which the gradation value of the pixel of interest is 1 become 1 (black) as a result of binarization processing.

In FIG. 14C, characters are reproduced without becoming illegible due to an effect of binarization performed in accordance with the condition 3.

That is, in the four-valued image in FIG. 12C, pixels in which the gradation value of the pixel of interest is 2 (the background of the characters) satisfy the condition 3. The threshold value of the binarization method 3 is relatively large, and thus the pixels in which the gradation value of the pixel of interest is 2 become 0 (white) as a result of binarization processing. In the four-valued image in FIG. 12C, pixels in which the gradation value of the pixel of interest is 2 (for example, the pixels near corners 131) become black as a result of adaptive binarization as in FIG. 13C.

FIG. 14C illustrates an example of binarization of characters on a dark background. In this binarized image, characters are white-outlined, which is regarded as the occurrence of white spots. However, in binarization processing, characters on a dark background are rare. As a matter of course, it is much better in terms of legibility than the case in FIG. 13C in which the characters are illegible.

In FIG. 14D, characters are reproduced without becoming illegible due to an effect of binarization performed in accordance with the condition 3.

That is, in the four-valued image in FIG. 12D, pixels in which the gradation value of the pixel of interest is 2 satisfy the condition 3. The threshold value of the binarization method 3 is relatively large, and thus the pixels in which the gradation value of the pixel of interest is 2 become 0 (white) as a result of binarization processing. In the four-valued image, pixels in which the gradation value of the pixel of interest is 3 (the background of the numeral 60) satisfy none of the conditions 1 to 3, and thus become black by the binarization method 4.

In the present embodiment, N-value conversion is described as quaternarization in which N equals 4. However, for example, when N equals 8, the number of conditions increases and the number of conditional branches increases in FIG. 10. Thus, when the conditions and the binarization processing based on the conditions can be made appropriate, the binarization result in FIG. 14C is more likely to be closer to the binarization result in FIG. 14A or FIG. 14B.

Effects of Binarization when None of Conditions 1 to 3 is Satisfied

Figure 15A:
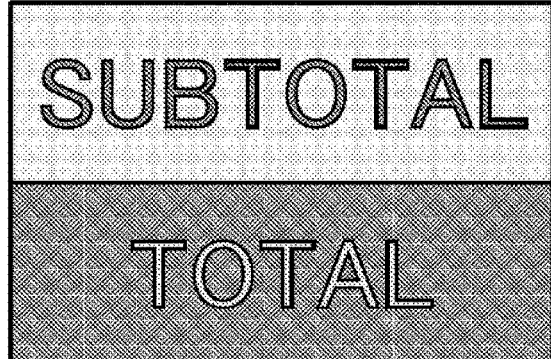
FIG. 15A illustrates an example of a four-valued image.
Figure 15B:
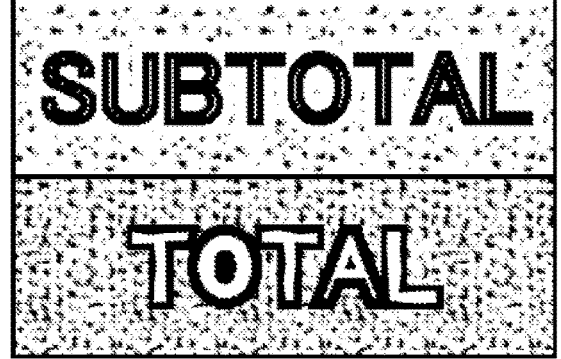
FIG. 15B and FIG. 15C each illustrate a binarized image obtained by adaptive binarization.
Figure 15C:

With reference to FIGS. 15A to 15D, effects of the binarization method 4 performed when none of the conditions 1 to 3 is satisfied will be described. FIG. 15A illustrates an example of a four-valued image. When adaptive binarization, which is binarization applied when the condition 2 or the condition 3 is satisfied, is applied to the four-valued image in FIG. 15A, the binarization result illustrated in FIG. 15B or FIG. 15C is obtained. Both FIGS. 15B and 15C illustrate a binarization result of adaptive binarization, but the offset values to be reflected in the threshold values are different. In either case, the background is not uniform due to noise, or white spots are seen inside the characters.

Figure 15D:
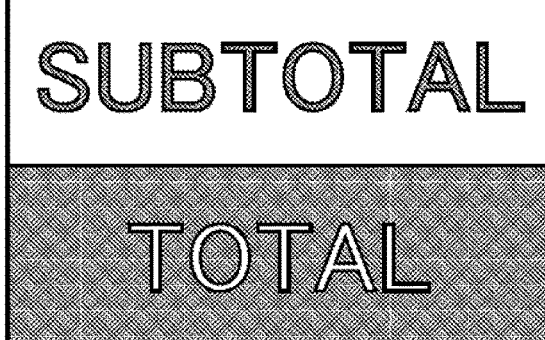
FIG. 15D illustrates a binarized image obtained by a binarization method of the present embodiment.

On the other hand, FIG. 15D illustrates a binarization result obtained when the binarization method 4 of the present embodiment is used. In FIG. 15D, the background is uniform, and there is no white spot inside the characters.

This is an effect of applying binarization equivalent to the discriminant analysis method when none of the conditions 1 to 3 is satisfied.

According to the present embodiment, it is possible to provide a technique of binarizing a multivalued image while reducing white spots.

More specifically, the binarization method according to the present embodiment achieves both the conversion of a light character or a character on a dark background into a more legible character and the reduction of occurrence of noise or white spots.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

In the configuration example illustrated in FIG. 4 and so forth, main functions are separately illustrated so as to facilitate understanding of the processing performed by the image processing apparatus 20. The present disclosure is not limited by how the units of processing are separated or by the names thereof. The processing performed by the image processing apparatus 20 can be divided into a larger number of units of processing in accordance with the details of processing. The processing can be divided such that one unit of processing includes more processing operations.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

According to a first aspect, an image processing apparatus includes a threshold value calculation unit, an N-value conversion unit, and a binarization unit. The threshold value calculation unit calculates, based on pixel values of an input image having M gradations, an N−1 first threshold value, M being greater than N, N being smaller than M and greater than 2. The N-value conversion unit compares the pixel values of the input image with the N−1 first threshold value to generate an N-valued image from the input image. The binarization unit generates, based on pixel values of each of local regions of the input image and gradation values of each of local regions of the N-valued image, a binarized image obtained by binarizing the input image.

According to a second aspect, in the image processing apparatus of the first aspect, when a first condition is satisfied, the first condition being that a count result of the number of pixels having a gradation value equal to a gradation value of a pixel of interest located at a center of a local region in the N-valued image is smaller than or equal to a second threshold value and that the number of types of gradation values in the local region is two, the binarization unit binarizes the pixel of interest in the N-valued image in accordance with another gradation value different from the gradation value of the pixel of interest.

According to a third aspect, in the image processing apparatus of the second aspect, when a second condition is satisfied, the second condition being that the gradation value of the pixel of interest in the N-valued image is a first predetermined value and that the input image includes an edge having a predetermined intensity or more, the binarization unit binarizes the input image by adaptive binarization.

According to a fourth aspect, in the image processing apparatus of the second or third aspect, when a third condition is satisfied, the third condition being that the gradation value of the pixel of interest in the N-valued image is a second predetermined value, the binarization unit binarizes the input image by adaptive binarization.

According to a fifth aspect, in the image processing apparatus of the first aspect, when none of a first condition, a second condition, and a third condition is satisfied, the first condition being that a count result of the number of pixels having a gradation value equal to a gradation value of a pixel of interest located at a center of a local region in the N-valued image is smaller than or equal to a second threshold value and that the number of types of gradation values in the local region is two, the second condition being that the gradation value of the pixel of interest in the N-valued image is a first predetermined value and that the input image includes an edge having a predetermined intensity or more, the third condition being that the gradation value of the pixel of interest in the N-valued image is a second predetermined value, the binarization unit binarizes the pixel of interest in the N-valued image into a value uniquely determined with respect to a gradation value in the local region.

According to a sixth aspect, in the image processing apparatus of the second aspect, when a second condition is not satisfied, the second condition being that the gradation value of the pixel of interest in the N-valued image is a first predetermined value and that the input image includes an edge having a predetermined intensity or more, a determination is made that a change in density in the local region of the input image is more gradual than a predetermined change. Furthermore, when a third condition is not satisfied, the third condition being that the gradation value of the pixel of interest in the N-valued image is a second predetermined value, the binarization unit binarizes the pixel of interest in the N-valued image into a value uniquely determined with respect to a gradation value in the local region.

According to a seventh aspect, in the image processing apparatus of the second aspect, when a second condition is satisfied, the second condition being that the gradation value of the pixel of interest in the N-valued image is a first predetermined value and that the input image includes an edge having a predetermined intensity or more, a determination is made that an edge is present in the local region, and the binarization unit performs adaptive binarization on the local region of the input image to binarize the input image.

According to an eighth aspect, in the image processing apparatus of any one of the first to seventh aspects, the threshold value calculation unit creates a histogram of gradation values and detects a value close to a minimum value of the histogram as the first threshold value.

According to a ninth aspect, in the image processing apparatus of the eighth aspect, the threshold value calculation unit applies a discriminant analysis method while changing a reference range of the histogram to calculate a plurality of first threshold values including the N−1 first threshold value.

According to a tenth aspect, in the image processing apparatus of the first aspect, when a first condition is satisfied, the first condition being that a count result of the number of pixels having a gradation value equal to a gradation value of a pixel of interest located at a center of a local region in the N-valued image is smaller than or equal to a second threshold value and that the number of types of gradation values in the local region is two, the binarization unit binarizes the pixel of interest in accordance with another gradation value different from the gradation value of the pixel of interest. When the first condition is not satisfied but a second condition is satisfied, the second condition being that the gradation value of the pixel of interest in the N-valued image is a first predetermined value and that an absolute value of a difference between an average value and a minimum value of a local region including a pixel of interest at a center in the input image is greater than or equal to a third threshold value, the binarization unit binarizes the input image by adaptive binarization. When the second condition is not satisfied but a third condition is satisfied, the third condition being that the gradation value of the pixel of interest in the N-valued image is a second predetermined value, the binarization unit binarizes the input image by adaptive binarization. When none of the first condition, the second condition, and the third condition is satisfied, the binarization unit binarizes the gradation value of the pixel of interest into a value uniquely determined with respect to a gradation value in the local region.

The invention claimed is:

1. An image processing apparatus comprising:
circuitry configured to:
   calculate, based on pixel values of an input image having M gradations, an N−1 first threshold value, wherein M>N>2;
   compare the pixel values of the input image with the N−1 first threshold value to generate an N-valued image from the input image;
   select, based on pixel values of each of local regions of the input image and gradation values of each of local regions of the N-valued image, a binarization method for a pixel of interest of the input image, and
   generate, based on the pixel values of each of local regions of the input image and the gradation values of each of local regions of the N-valued image, a binarized image obtained by using the selected binarization method that binarizes the pixel of interest of the input image based on pixel values of a local region including the pixel of interest in the input image and the gradation values of the local region including the pixel of interest in the N-valued image.

2. The image processing apparatus according to claim 1, wherein
   when a first condition is satisfied, the first condition being that a count result of the number of pixels having a gradation value equal to a gradation value of the pixel of interest located at a center of a local region in the N-valued image is smaller than or equal to a second threshold value and that the number of types of gradation values in the local region is two, the circuitry is configured to binarize the pixel of interest in the N-valued image in accordance with another gradation value different from the gradation value of the pixel of interest.

3. The image processing apparatus according to claim 2, wherein when a second condition is satisfied, the second condition being that the gradation value of the pixel of interest in the N-valued image is a first predetermined value and that the input image includes an edge having a predetermined intensity or more, the circuitry is configured to binarize the input image by adaptive binarization.

4. The image processing apparatus according to claim 2, wherein when a third condition is satisfied, the third condition being that the gradation value of the pixel of interest in the N-valued image is a second predetermined value, the circuitry is configured to binarize the input image by adaptive binarization.

5. The image processing apparatus according to claim 1, wherein when none of a first condition, a second condition, and a third condition is satisfied, the first condition being that a count result of the number of pixels having a gradation value equal to a gradation value of the pixel of interest located at a center of a local region in the N-valued image is smaller than or equal to a second threshold value and that the number of types of gradation values in the local region is two, the second condition being that the gradation value of the pixel of interest in the N-valued image is a first predetermined value and that the input image includes an edge having a predetermined intensity or more, the third condition being that the gradation value of the pixel of interest in the N-valued image is a second predetermined value, the circuitry is configured to binarize the pixel of interest in the N-valued image into a value uniquely determined with respect to a gradation value in the local region.

6. The image processing apparatus according to claim 2, wherein when a second condition is not satisfied, the second condition being that the gradation value of the pixel of interest in the N-valued image is a first predetermined value and that the input image includes an edge having a predetermined intensity or more, the circuitry is configured to determine that a change in density in the local region of the input image is more gradual than a predetermined change, and when a third condition is not satisfied, the third condition being that the gradation value of the pixel of interest in the N-valued image is a second predetermined value, the circuitry is configured to binarize the pixel of interest in the N-valued image into a value uniquely determined with respect to a gradation value in the local region.

7. The image processing apparatus according to claim 2, wherein when a second condition is satisfied, the second condition being that the gradation value of the pixel of interest in the N-valued image is a first predetermined value and that the input image includes an edge having a predetermined intensity or more, the circuitry is configured to:

determine that an edge is present in the local region, and perform adaptive binarization on the local region of the input image to binarize the input image.

8. The image processing apparatus according to claim 1, wherein the circuitry is configured to create a histogram of gradation values and detect a value close to a minimum value of the histogram as the first threshold value.

9. The image processing apparatus according to claim 8, wherein the circuitry is configured to apply a discriminant analysis method while changing a reference range of the histogram to calculate a plurality of first threshold values including the N−1 first threshold value.

10. The image processing apparatus according to claim 1, wherein when a first condition is satisfied, the first condition being that a count result of the number of pixels having a gradation value equal to a gradation value of the pixel of interest located at a center of a local region in the N-valued image is smaller than or equal to a second threshold value and that the number of types of gradation values in the local region is two, the circuitry is configured to binarize the pixel of interest in the N-valued image in accordance with another gradation value different from the gradation value of the pixel of interest, when the first condition is not satisfied but a second condition is satisfied, the second condition being that the gradation value of the pixel of interest in the N-valued image is a first predetermined value and that an absolute value of a difference between an average value and a minimum value of a local region including a pixel of interest at a center in the input image is greater than or equal to a third threshold value, the circuitry is configured to binarize the input image by adaptive binarization, when the second condition is not satisfied but a third condition is satisfied, the third condition being that the gradation value of the pixel of interest in the N-valued image is a second predetermined value, the circuitry is configured to binarize the input image by adaptive binarization, and when none of the first condition, the second condition, and the third condition is satisfied, the circuitry is configured to binarize the pixel of interest in the N-valued image into a value uniquely determined with respect to a gradation value in the local region.

11. The image processing apparatus according to claim 1, wherein when a predetermined condition relating to the gradation values of pixels in the local region including the pixel of interest in the N-valued image is satisfied, the circuitry is configured to binarize the pixel of interest in the N-valued image in accordance with another gradation value different from the gradation value of the pixel of interest.

12. A binarization method performed by an image processing apparatus, the binarization method comprising:

calculating, based on pixel values of an input image having M gradations, an N−1 first threshold value, wherein M>N>2;

comparing the pixel values of the input image with the N−1 first threshold value to generate an N-valued image from the input image;

selecting, based on pixel values of each of local regions of the input image and gradation values of each of local regions of the N-valued image, a binarization method for a pixel of interest of the input image, and generating, based on the pixel values of each of local regions of the input image and the gradation values of each of local regions of the N-valued image, a binarized image obtained by using the selected binarization method that binarizes the pixel of interest of the input image based on pixel values of the local region including the pixel of interest in the input image and the gradation values of the local region including the pixel of interest in the N-valued image.

13. A non-transitory recording medium storing a plurality of instructions which, when executed by one or more processors, causes the one or more processors to perform a binarization method comprising:

calculating, based on pixel values of an input image having M gradations, an N−1 first threshold value, wherein M>N>2;

comparing the pixel values of the input image with the N−1 first threshold value to generate an N-valued image from the input image;

selecting, based on pixel values of each of local regions of the input image and gradation values of each of local regions of the N-valued image, a binarization method for a pixel of interest of the input image, and generating, based on the pixel values of each of local regions of the input image and the gradation values of each of local regions of the N-valued image, a binarized image obtained by using the selected binarization method that binarizes the pixel of interest of the input image based on pixel values of the local region including the pixel of interest in the input image and the gradation values of the local region including the pixel of interest in the N-valued image.

\* \* \* \* \*